Feb. 22, 1938. G. B. ANTHONY 2,108,840
UNDERGROUND TRAP FOR LEAKING GAS
Filed June 29, 1936
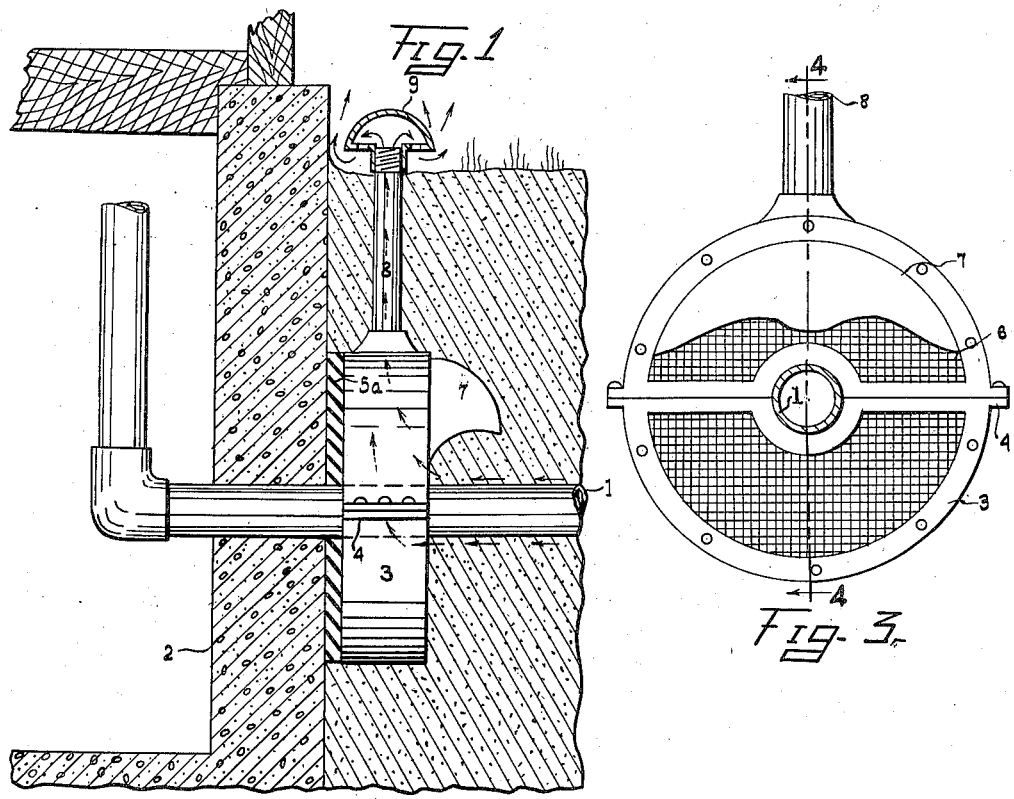
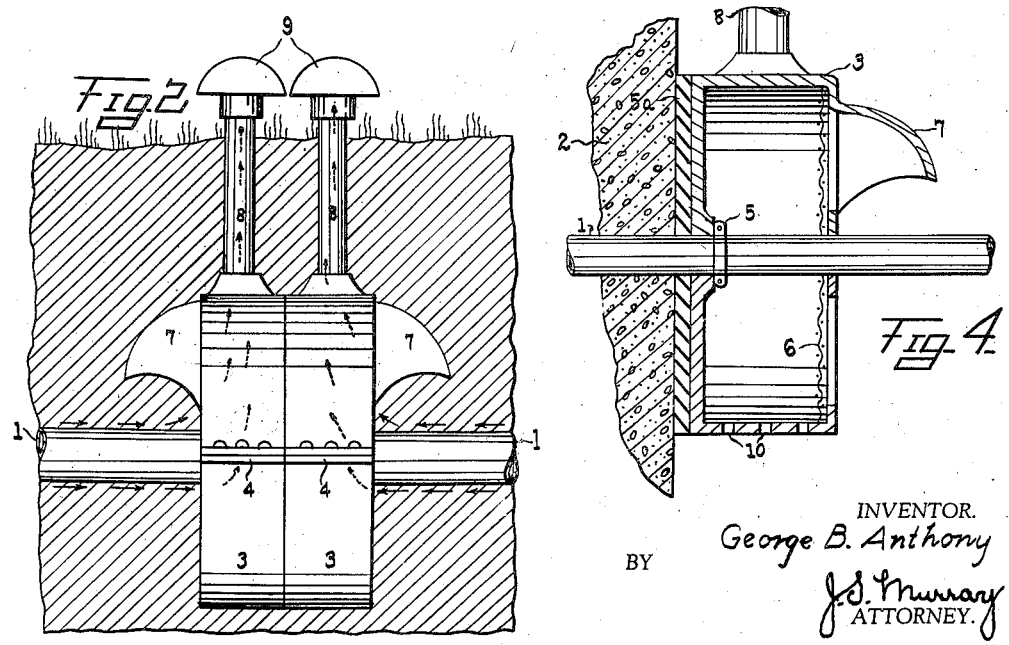
INVENTOR.
George B. Anthony
BY
J. S. Murray
ATTORNEY.

Patented Feb. 22, 1938

2,108,840

UNITED STATES PATENT OFFICE 2,108,840

UNDERGROUND TRAP FOR LEAKING GAS

George B. Anthony, Detroit, Mich.

Application June 29, 1936, Serial No. 87,961

1 Claim. (Cl. 48—193)

This invention relates to underground gas pipes, and particularly to the problem of gas leakage from such pipes.

When a leak develops in an underground pipe, the escaping gas commonly travels in exterior proximity to the pipe, since the earth closely surrounding the pipe is usually much less firmly packed than the more remote earth. The tendency of the gas, therefore, is to find its way eventually to the foundations of buildings served from the leaking pipe, and in spreading along the foundations, it will enter such buildings, if any crack or other orifice is encountered. In this manner, many explosions, fires, and asphyxiations have been caused.

An object of the invention is to entrap leaking gas as it approaches a building, while traveling along a service pipe, and to provide for a harmless discharge of such gas to the atmosphere.

Another object is to provide a fitting, for installation at any point in the length of an underground pipe, to trap and discharge to the surface any gas approaching such point from either direction along the pipe exterior.

A further object is to so construct the trap as to exclude earth while affording gas a free entrance.

These and various other objects the invention attains by the construction hereinafter described, and illustrated in the accompanying drawing, wherein:

Fig. 1 is fragmentary, sectional elevation of a building foundation, showing my gas trap installed at the intersection of a service pipe with said foundation.

Fig. 2 is a view showing two of the traps installed in a back to back relation, so as to entrap gas approaching the installation from either direction, along a pipe.

Fig. 3 is a front view of the trap shown in Fig. 1.

Fig. 4 is an axial vertical section of the same, taken on the line 4—4 of Fig. 3.

In these views, the reference character 1 designates a gas pipe, and 2 the foundation wall of a building serviced by such pipe. The invention comprises a metallic trap 3, preferably circular and formed in diametrtically joined halves. The trap is formed with laterally projecting lugs 4 at the juncture of its halves, which lugs are bolted together to clamp the trap on the pipe 1, coaxially therewith. The rear wall of the trap is imperforate and adjoins the foundation 2, being preferably separated from the latter by a layer 5a of sealing material such as cork or asphalt. A collar 5, clamped on the gas pipe within the trap, engages said imperforate wall thereof to maintain the desired proximity of the trap to the foundation. The front wall of the trap is formed by upper and lower screens 6 or the like, and from the upper marginal portion of said wall a hood 7 projects forwardly and downwardly, its forward end being positioned in use slightly above the pipe. From the top of the trap, a pipe 8 rises to the surface of the ground and, just above such surface, carries a cap 9, preferably approximately hemi-spherical, having gas outlets thereunder. Preferably the bottom of the trap is formed with several drain openings 10, through which any water entering the trap may be discharged.

In use of the described trap, any gas approaching the foundation exteriorly along the pipe, as indicated by the arrows (Fig. 1) finds its way through the screens 6 into the trap and is discharged harmlessly from the latter at the ground surface by way of the pipe 8.

In the installation shown in Fig. 2, two of the described traps are secured on a pipe at any desired point of its length in back-to-back relation, so as to intercept and carry to the surface, gas approaching such point from either direction along the pipe exterior.

The invention is presented as including all such modifications and changes as come within the scope of the following claim.

What I claim is:

In a device of the character described, the combination with a gas pipe traversing a wall, of a trap in proximity to such wall, formed with a chamber to entrap gas exteriorly following the pipe, and with an inlet to such chamber, artificial packing means interposed between the trap and wall, a collar secured on the pipe within the trap, positioning the trap in effective engagement with the packing, and a vent pipe extending from the trap to the surface of the ground.

GEORGE B. ANTHONY.